United States Patent [19]

Petkovic

[11] Patent Number: 5,449,015
[45] Date of Patent: Sep. 12, 1995

[54] SHOCK-ACTIVATED SHUT-OFF VALVE

[76] Inventor: Tony Petkovic, 3045 W. 5th Avenue, Vancouver, Canada, V6K 1T8

[21] Appl. No.: 241,549

[22] Filed: May 12, 1994

[51] Int. Cl.⁶ .............................................. F16K 17/36
[52] U.S. Cl. ........................................ 137/38; 251/65; 251/72
[58] Field of Search ................... 137/38, 39; 251/72, 251/65

[56] References Cited

U.S. PATENT DOCUMENTS

| 4,603,591 | 8/1986 | Sibley | 137/38 X |
| 4,915,122 | 4/1990 | Ikegaya | 137/38 |

*Primary Examiner*—Robert G. Nilson
*Attorney, Agent, or Firm*—Townsend and Townsend Khourie and Crew

[57] ABSTRACT

A shock-activated shut-off valve including a housing having an upper chamber and a lower chamber separated by a flap-gate pivotally connected to the housing, the lower chamber comprising an inlet orifice, and outlet orifice and a flap-gate stop means; a weight; a shock-actuated retainer defining a weight-passable opening and a latching means comprising a receptacle arm pivotally connected to a counter-weight and a flap-gate actuator, wherein, in one position, the counter-weight maintains the receptacle arm and the flap-gate in a horizontal position and the weight rests on the retainer and wherein, in another position, upon shock-actuation, the weight disassociates from the retainer and, subject to vertical acceleration, engages the receptacle arm, exerting a force which exacts pivotal movement of the counterweight to allow release of the flap-gate from a horizontal position to a position engaging the flap-dash gate stop means, thereby closing the inlet orifice from the outlet orifice.

13 Claims, 3 Drawing Sheets

SHOCK-ACTIVATED SHUT-OFF VALVE

FIELD OF THE INVENTION

This invention relates to improved valve devices for automatically closing off the flow of a fluid, such as natural gas or water when the device is subjected to earthquake forces or other similar shock forces.

BACKGROUND OF THE INVENTION

The most devastating aspect of a shock, such as an earthquake, is the rupture of natural gas lines and the subsequent fires and explosions. Even a small leak in a gas line can accumulate enough gas in a building to cause a serious explosion if ignited. A major portion of the damage following the San Francisco earthquake of 1906 and more recently, the Los Angeles quake of 1993 resulted from the fires following the tremors rather than the structural damage of the shock. Other natural disasters such as tornadoes and hurricanes can severely damage the integrity of natural gas lines.

Similarly, in war zones such as the former Yugoslavia, it would be desirable to be able to shut down gas lines when under bomb or shell attack.

Recognizing the need for a shut-off valve mechanism for natural gas lines, various devices have been developed over the past twenty years. Several of these devices are intricate, expensive to manufacture and focus primarily on industrial as opposed to household or consumer use. Others simply do not work.

U.S. Pat. No. 3,965,917 to Speck discloses an earthquake valve in which a shock causes two interlocked cylinders to become misaligned, which in turn causes a latching means to release a valve to close the pipe.

U.S. Pat. No. 4,336,818 to Dauvergne discloses another earthquake valve. In this case, a shock to the valve causes the metal ball to be horizontally dislodged from its pedestal, which allows a flap closure to drop closing the valve over the gas line.

U.S. Pat. No. 5,143,110 to Simpson discloses another arrangement in which the series of balls moves up the sides of the valve under shock, allowing a piston to drop into the closed position.

U.S. Pat. No. 4,915,122 to Ikegaya et al. Provides a device in which a shock to the valve causes a ball to roll off a pedestal, forcing a cylindrical tube downwardly to release a latching mechanism and causing the valve to rotate downwardly into a closed position.

Each of these devices comprise a multitude of interconnecting parts and would be expensive to manufacture and sell, particularly for the household and consumer market. In addition, the installation and use of these devices is not practical at the consumer level.

Although the Simpson patent claims to provide an earthquake sensing mechanism that is omnidirectional in its sensitivity, none of these devices allow for a simple means of sensitivity adjustment. In addition and equally importantly, none of these devices can be easily reset by a non-technical person.

It is an object of a present invention to obviate and mitigate the above disadvantages.

SUMMARY OF THE INVENTION

The present invention provides a shock-activated shut-off valve which comprises a housing having an upper chamber and a lower chamber separated by a flap-gate pivotally connected to the housing, the lower chamber comprising an inlet orifice, an orifice and a flap-gate stop means; a weight; a shock-actuated retainer defining a weight-passable opening; and a latching means comprising a receptacle arm pivotally connected to a counter-weight and a flap-gate actuator; wherein, in one position the counter-weight maintains the receptacle arm and the flap-gate in a horizontal position and the weight rests on the retainer and wherein, in another position, upon shock-actuation, the weight disassociates from the retainer and, subject to vertical acceleration, engages the receptacle arm, exerting a force which exacts pivotal movement of the counter-weight to allow release of the flap-gate from a horizontal position to a position engaging the flap-gate means, thereby closing the inlet orifice from the outlet orifice.

This device is simple to manufacture and use as there are only two moving parts: the receptacle arm and the flap-gate. Simply put, the device responds to physical disturbances and relies on the gravitational force of the weight which, on release from the retainer, vertically engages the receptacle arm which in turn activates the counterweight to bias the receptacle arm against the flap-gate thereby forcing the flap-gate into the closed position over the outlet orifice. This weight and counterweight feature is not found in any of the previously known devices.

The shock-actuated retainer of the present invention may be adjusted for sensitivity as it is not appropriate for the valve closure to be activated by loud noises, the movement of heavy vehicles or insignificant tremors. This adjustment feature is particularly important when the valve is installed in areas of heavy commercial traffic, near airports, or where earthquake tremors of low magnitude are common. This adjustment feature is discussed further hereinbelow.

In addition, a quick and efficient reset mechanism is provided which allows, in the event of accidental activation, the possibility of immediate reset by a non-technical person.

The device of the present invention can be readily used by a household consumer and is purposely designed to enable attachment to existing natural gas lines. However, the present valve is not limited to association with natural gas lines and may be used to shut off any controlled fluid such as water or other gases. The present invention affords numerous advantages over the known devices. Not only is it simple in its operation and easy to manufacture but in a preferred form, it provides a means of sensitivity adjustment and reset not found in any known device.

These and other features and advantages will become apparent upon consideration of the non-limiting drawings and the detailed description of the preferred embodiment of this invention.

DESCRIPTION OF THE PREFERRED EMBODIMENT

Figure 1:
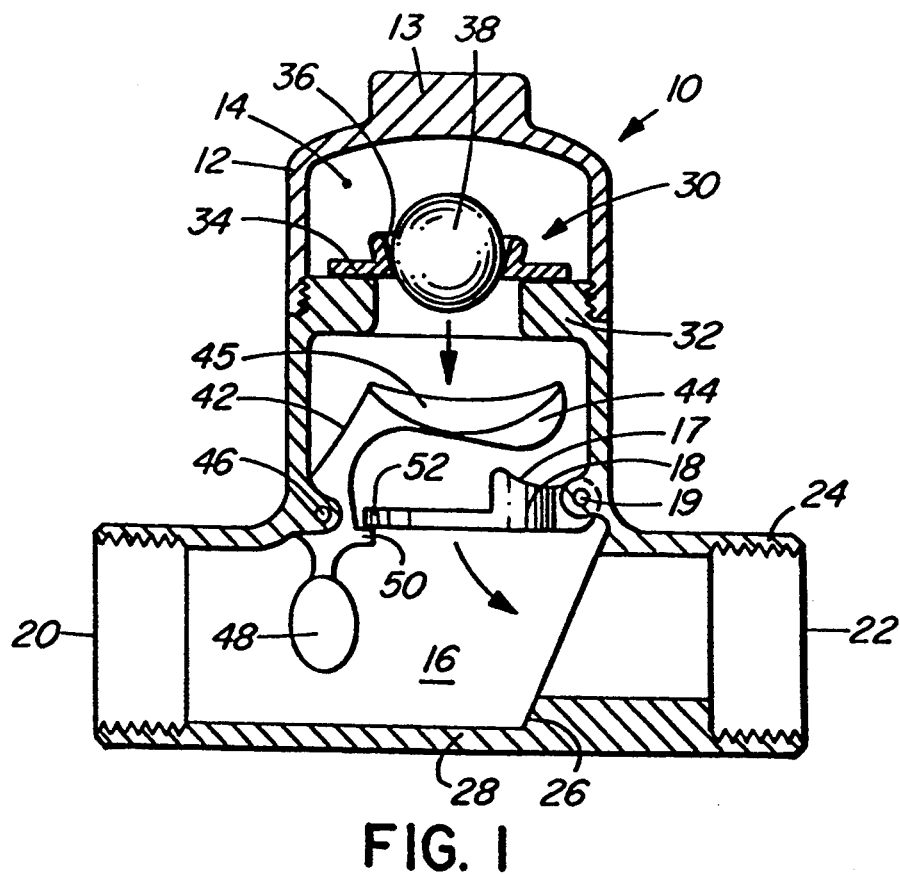
FIG. 1 is a central vertical sectional view through a shock-activated shut-off valve assembly embodying one aspect of the invention and showing the controlled valve in an open position.
Figure 2:
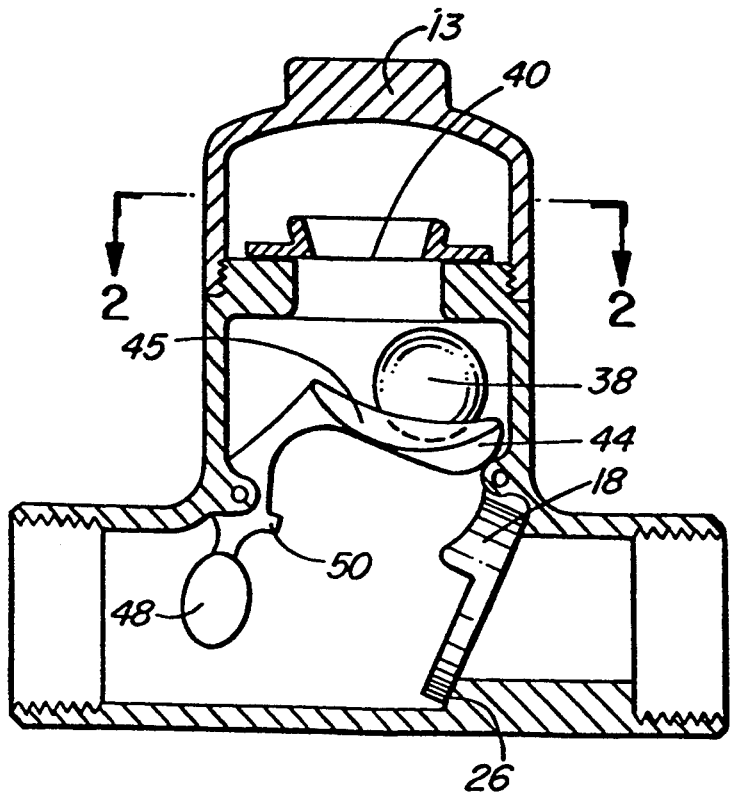
FIG. 2 is another central vertical section view through the valve of FIG. 1, but showing the valve in the closed position.
Figure 3:
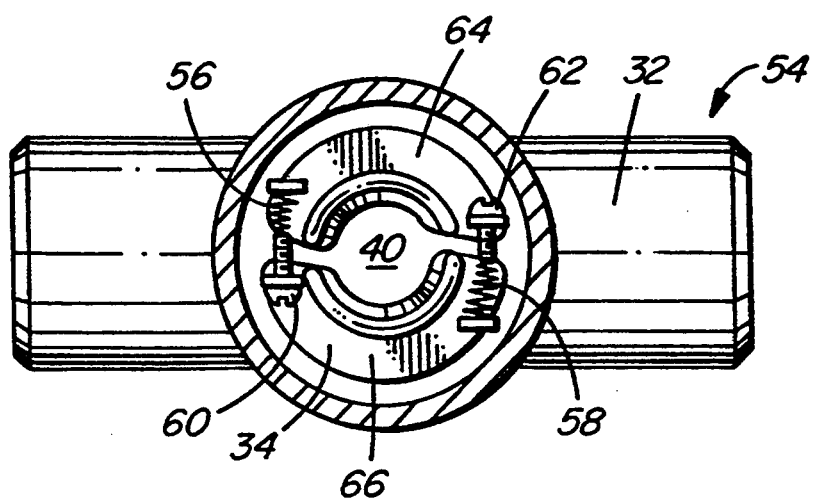
FIG. 3 is a top plan view of one embodiment of a shock-actuated retainer taken through line 2—2 of FIG. 2.
Figure 4:
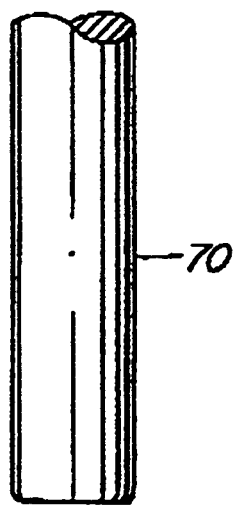
FIG. 4 is a side view of one embodiment of a reset mechanism for use in the present invention.

The following description refers to FIGS. 1 through 3 which show the invention in its presently preferred embodiment. Referring first to FIG. 1, there is illustrated at 10 a shock-activated shut-off valve assembly which is adapted to automatically close off flow of a controlled fluid such as natural gas through a pipe line in response to earthquake forces or other shock forces of predetermined magnitude. The device includes a tubular main housing 12 which may be manufactured of brass, aluminum, stainless steel or any suitable material. Most preferably, it is made of stainless steel. The housing 12 includes an upper chamber 14 and a lower chamber 16 which are separated, when the valve is in the open position, by a flap-gate, 18 which is pivotally connected at axis 19 to housing 12. The upper chamber also provides a cap 13 which is removably connected to housing 12. Flap-gate 18 defines, on its upper surface, contact site 17.

The lower chamber 16 includes an inlet orifice 20 and an outlet orifice 22 which are integral with the lower chamber and housing 12. The inlet orifice 20 and the outlet orifice 22 may be threaded 24 for connecting to three quarter inch, one inch or other sizes of pipes. It is contemplated within the scope of the invention that other connection means may be provided.

The lower chamber also includes a flap-gate stop means 26 adjacent outlet orifice 22 and positioned to abut flap-gate 18 in the closed position. Most preferably, flap-gate stop means 26 is integral with the lining 28 of lower chamber 16.

The upper chamber 14 contains the shock-activated valve actuating mechanism. Positioned within upper chamber 14 is a shock-actuated retaining means 30 which, in a preferred embodiment comprises a collar 32 formed integrally with housing 12 and annular lip 34 coupled with collar 32. Alternatively, collar 32 is fastened to housing 12 by means of a set screw or other connecting means. Most preferably, inner surface 36 of annular lip 34 extends upwardly and towards housing 12 thus creating a cradle on which weight 38 rests when the valve is in the open position. The coupling of collar 32 and annular lip 34 may be affected by a screw interconnecting the two parts or by any other suitable fastening means. Annular lip 34 defines an opening 40 (depicted more clearly in FIGS. 2 and 3) through which weight 38 passes on activation of the valve. The orientation and association of collar 32 and annular lip 34 will become apparent in the description of FIG. 3 hereinbelow.

A latching means is provided generally at 42 and includes a receptacle arm 44 pivotally connected at axis 46 on housing 12 to counterweight 48. An abutment 50 extends inwardly from the lower portion of receptacle arm 44 and engages end 52 of flap-gate 18 so that the flap-gate is maintained in the open and horizontal position. Accordingly, when the valve is in the open position, receptacle arm 44 is maintained in a horizontal position by the force of counterweight 48 which likewise maintains abutment 50 in a position engaging end 52 of flap-gate 18.

The upwardly facing surface 45 of receptacle arm 44 is most preferably contoured and conforming in part to the surface of weight 38.

Referring to FIG. 3, where like numerals in FIGS. 1 and 2 refer to corresponding parts, the retaining means is designated generally by 54. Collar 32 and annular lip 34 together define weight-passable opening 40. The sensitivity controlling mechanism includes annular lip 34 generally and more specifically, resilient members 56 and 58 which are threadably engaged with screws 60 and 62 in a formation that will become more apparent hereinbelow. Annular lip 34 comprises two separate members 64 and 66, preferably each of a semi-circular configuration. To each of members 64 and 66 is secured at one end, either of screws 60 or 62 and at the other end, either of resilient members 56 or 58. Preferably, the resilient members are coiled spirals, springs, or elastics. Other components achieving substantially the same result, however, are considered to be within the scope of the present invention.

The result of this arrangement is that the size and dimension of weight-passable opening 40 can be increased by loosening the threadable connection between each of the screws 60 and 62 and their respective resilient members 56 and 58 or conversely, decreased by tightening this threadable connection.

The sensitivity adjustment mechanism of the present invention is not limited to the specifics of the preferred embodiment depicted herein. There are numerous other clamp and spring or elastic elements which may achieve substantially the same result.

Preferably, weight 38 may take the form of a ball or sphere. It must be of sufficient weight so that when released from retaining means 54 and accelerated, its mass displaces receptacle arm 44 and counterweight 48 from their respective preset positions. Most preferably, weight 38, receptacle arm 44, flap-gate 18 and counterweight 48 are formed of brass, stainless steel or other suitable material.

In operation and with reference to FIGS. 1 and 2, when the valve is open, weight 38 rests on annular lip 34 and counterweight 48 biases receptacle arm 44 in a horizontal position. In this configuration, end 52 of flap-gate 18 rests on abutment 50 thus providing an unobstructed path between inlet orifice 20 and outlet orifice 22. On shock or vibration of a predetermined magnitude, the movement of resilient members 56 and 58 causes annular lip 34 to vibrate. This vibration, if of a significant nature, will necessarily allow weight 38, heretofore resting on annular lip 34, to pass through weight-passable opening 40 and accelerate vertically towards upwardly facing surface 45 of receptacle arm 44. On engagement, the force of the accelerated weight displaces counterweight 48 form its resting position. This displacement has two effects:

1) receptacle arm 44 engages contact surface 17; and
2) abutment 50 disengages end 52 of flap-gate 18 which together allow the movement of flap-gate 18 to a closed position abutting flap-gate stop-means 26 in lower chamber 16.

To reset the valve after activation and with reference to FIG. 2, cap 13 is removed from housing 12 and a magnetic reset rod is inserted into upper chamber 14. This reset rod is suitably of any shape or size. The only two restrictions are that:

1) at least a portion of the reset rod fits within upper chamber 14; and
2) the magnetic force of the reset rod is of sufficient magnitude to pull weight 38, receptacle arm 44, flap-gate 18 and counterweight 48 to their respective positions depicted in FIG. 1.

On insertion of the reset rod, receptacle arm 44 may retract before flap-gate 18. In this configuration, end 52 of flap-gate 18 is not properly held in place by abutment 50. To prevent this configuration, a second, narrow bias rod which may be made of any material, including plastic, is inserted into upper chamber 14 through weight-passable opening 40 and forcibly positioned against upwardly facing surface 45 of receptacle arm 44. This secure positioning allows flap-gate 18 to be pulled initially to the reset position of FIG. 1. The bias rod is then removed from upper chamber 14 without moving the placement of the magnetic reset rod and without interrupting the magnetic force exerted by the reset rod, weight 38 and receptacle arm 44 are pulled into the reset position of FIG. 1.

The sensitivity controlling mechanism as shown preferably in FIG. 3 and described hereinabove, may be readily adjusted by the manufacturer or the consumer of the present invention in order to tailor the valve to conditions of differing sensitivity.

I claim:

1. A shock-activated shut-off valve comprising:
   a housing having an upper chamber and a lower chamber separated by a flap-gate pivotally connected to the housing, the lower chamber comprising an inlet orifice, an outlet orifice and a flap-gate stop means;
   a weight;
   a shock-actuated retainer defining a weight-passable opening; and
   a latching means comprising a receptacle arm pivotally connected to a counterweight and a flap-gate actuator;
   wherein, in one position, the counterweight maintains the receptacle arm and the flap-gate in a horizontal position and the weight rests on the retainer and wherein, in another position, upon shock-actuation, the weight disassociates from the retainer and, subject to vertical acceleration, engages the receptacle arm, exerting a force which exacts pivotal movement of the counterweight to allow release of the flap-gate from a horizontal position to a position engaging the flap-gate stop means, thereby closing the inlet orifice from the outlet orifice.

2. The shut-off valve of claim 1 wherein the retainer comprises a cradle having a protruding lip which engages the weight.

3. The shut-off valve of claim 1 wherein the retainer comprises two semi-circular members coupled by a yielding means.

4. The shut-off valve of claim 3 wherein the yielding means comprises an adjustable coiled spiral.

5. The shut-off valve of claim 1 wherein the receptacle arm comprises a dish for receiving the weight.

6. The shut-off valve of claim 1 wherein the housing comprising an external entry orifice.

7. The shut-off valve of claim 1 wherein the weight is a sphere.

8. The shut-off valve of claim 1 wherein the weight is stainless steel.

9. The shut-off valve of claim 1 wherein the flap-gate is stainless steel.

10. The shut-off valve of claim 1 wherein the receptacle arm is stainless steel.

11. A shock-activated shut-off valve comprising:
    a housing with an external entry orifice having an upper chamber and a lower chamber separated by a stainless steel flap-gate pivotally connected to the housing, the lower chamber comprising and inlet orifice, and outlet orifice and a flap-gate stop means;
    a spherical stainless steel weight;
    a shock-actuated retainer comprising a cradle having a raised lip and defining a weight-passable opening; and
    a latching means comprising a stainless steel receptacle arm pivotally connected to a stainless steel counterweight and a flap-gate actuator;
    wherein, in one position, the counterweight maintains the receptacle arm and the flap-gate in a horizontal position and the spherical weight rests on the lip of the cradle and wherein, in another position, upon shock-actuation, the weight disassociates from the retainer and, subject to vertical acceleration, engages the receptacle arm, exerting a force which exacts pivotal movement of the counterweight to allow release of the flap-gate from a horizontal position to a position engaging the flap-gate stop means, thereby closing the inlet orifice from the outlet orifice.

12. The shut-off valve of claim 11 further comprising a reset mechanism.

13. The shut-off valve of claim 12 wherein the reset mechanism comprises a magnetic rod insertable through the external entry orifice, which rod exerts a magnetic force on the weight, the receptacle arm, the flap-gate and the counterweight thereby returning these components to their respective non-activated positions.

* * * * *